(No Model.)
J. WAGNER.
MECHANISM FOR WORKING ORGAN BELLOWS.
No. 254,738. Patented Mar. 7, 1882.
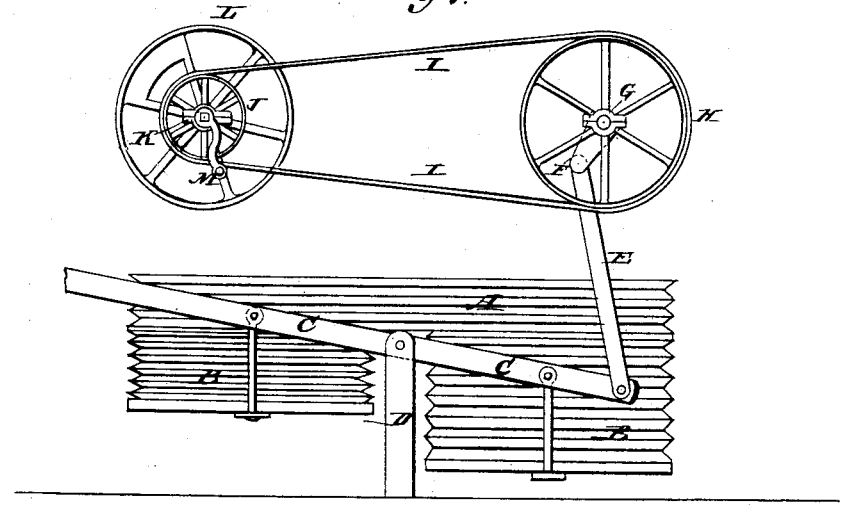
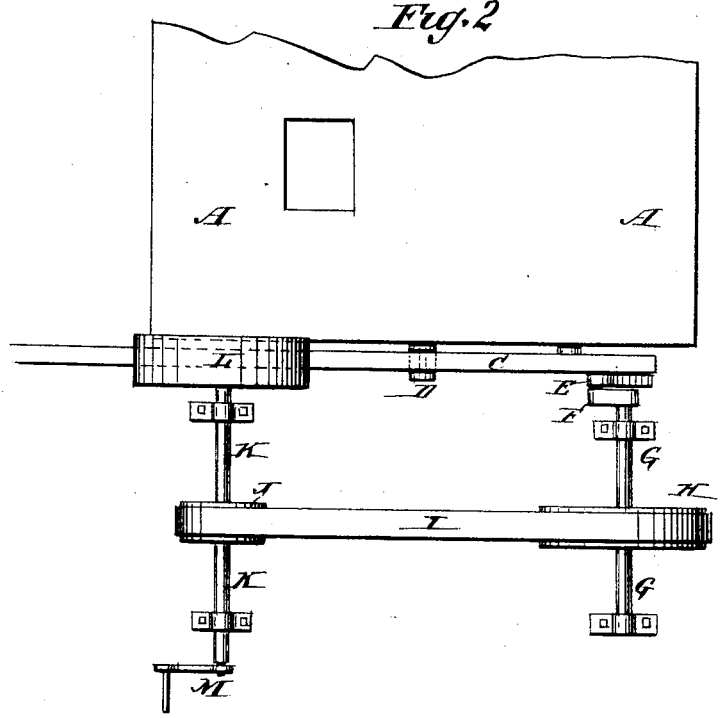
WITNESSES:
Francis McArdle
C. Sedgwick
INVENTOR:
J. Wagner
BY Munn & Co.
ATTORNEYS.

UNITED STATES PATENT OFFICE.

JULIUS WAGNER, OF READING, PENNSYLVANIA.

MECHANISM FOR WORKING ORGAN-BELLOWS.

SPECIFICATION forming part of Letters Patent No. 254,738, dated March 7, 1882.

Application filed December 30, 1881. (No model.)

*To all whom it may concern:*

Be it known that I, JULIUS WAGNER, of Reading, in the county of Berks and State of Pennsylvania, have invented a new and useful Improvement in Mechanisms for Working Organ-Bellows, of which the following is a full, clear, and exact description.

Reference is to be had to the accompanying drawings, forming a part of this specification, in which similar letters of reference indicate corresponding parts in both the figures.

Figure 1 is a front elevation of my improvement. Fig. 2 is a plan view of the same.

The object of this invention is to promote convenience in working the bellows of organs.

The invention consists in the combination, with the lever connected with the bellows of an organ, of a connecting-rod, two crank-shafts, two pulleys attached to the shafts, a belt connecting the pulleys, and a fly-wheel, whereby the said bellows can be readily worked, as will be hereinafter fully described.

A represents the wind-chest, and B the bellows, of an organ.

C is a lever, which is pivoted to a post, D, or other suitable support, and which is connected with the bellows B upon the opposite sides of and equally distant from its fulcrum.

To the lever C is pivoted the lower end of a connecting-bar, E, the upper end of which is pivoted to a crank, F. The crank F is attached to a shaft, G, which revolves in bearings attached to the wall of the room, the frame of the organ, or other suitable supports, and to it is attached a large pulley, H, around which passes a belt, I. The belt I also passes around a smaller pulley, J, attached to a shaft, K, which works in bearings attached to the wall, or to posts or other suitable supports.

To the shaft K is attached a fly-wheel, L, to give steadiness of motion to the mechanism. To the end of the shaft K is attached a crank, M, by means of which the mechanism is operated.

With this construction a steady and uniform motion can be given to the bellows, and the bellows can be worked with a much less expenditure of power than when they are worked by means of a lever in the ordinary manner.

Having thus described my invention, I claim as new and desire to secure by Letters Patent—

The combination, with the lever C, connected with the bellows B of an organ, of the connecting-rod E, the crank-shafts F G M K, the pulleys and belts H J I, and the fly-wheel L, substantially as herein shown and described, whereby the said bellows can be readily worked, as set forth.

JULIUS WAGNER.

Witnesses:
J. P. KREMP,
L. KREMP.